June 1, 1954   J. I. RESLER   2,679,681
METHOD OF MAKING EXPANDED TUBE ENDS
Filed June 23, 1949

INVENTOR.
John I. Resler
BY
Barnes, Kisselle, Laughlin & Raisch
Attorneys.

Patented June 1, 1954

2,679,681

UNITED STATES PATENT OFFICE 2,679,681

METHOD OF MAKING EXPANDED TUBE ENDS

John I. Resler, Mount Clemens, Mich., assignor to Bundy Tubing Company, Detroit, Mich., a corporation of Michigan Application June 23, 1949, Serial No. 100,865

1 Claim. (Cl. 29—156)

This invention relates to the matter of connecting the end of a length of tubing to another conduit member where the end of the length of tubing is telescopingly disposed over the other member.

More specifically, the invention has to do with the situation where the end of one metal tubing is expanded to telescopingly receive another tubing or conduit member. A connection of this type is desirable, for example, in the refrigeration industry where a length of tubing, fashioned into a coil, is to be connected to another tube for conducting refrigerant. Where the end of a tubing is expanded or enlarged there is a tendency to split the metal, and the split almost invariably starts at the extreme end of the tubing. It is economically unsound to thus attempt to expand one or both ends of a coil of tubing, even if only a few of them split, because of the wastage of all the time, labor and material involved in making the tubing and shaping it into a coil.

The invention aims to provide a method of so treating and working a length of tubing that it may be expanded without splitting and the invention also has to do with the article. In carrying out the invention, some of the metal of the tubing wall is removed, this being at the extreme end of the tubing, so that the tubing wall at this location, is not expanded to such a great extent and so that the expanding action is less severe on the extreme end of the tubing. Moreover, a tubing thus expanded in accordance with the invention presents an expanded portion of symmetrical appearance in that both ends of the expanded section is defined by an inwardly extending exterior curved surface. The extreme end of the expanded section presents a nicely rounded outer surface extending toward the tubing telescoped into the same, and the inner or base end of the expanded section has quite a similar exterior curved surface extending from the expanded diameter to the normal unexpanded tubing wall. The invention is demonstrated in the accompanying drawing:

Figure 1:
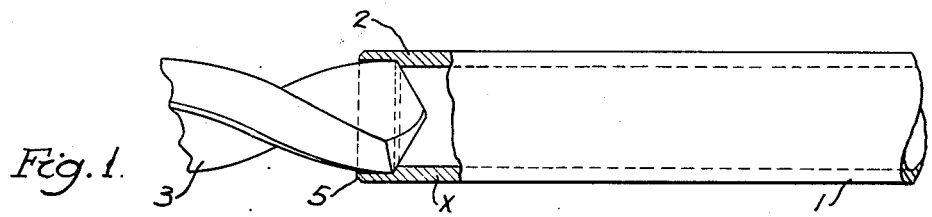
Fig. 1 is a view showing a drill performing the first operation on the end of a length of tubing.

The tubing is illustrated at 1, it being appreciated that so much of the tubing as shown in Fig. 1 is an end portion of a length of tubing, and this length of tubing may be in any suitable shape, such, for example, as a coil. The tubing may be of steel fashioned from strip stock which is formed into tubular form with interfaces bonded together to seal the tubing, as by means of welding, brazing or otherwise. The tubing wall 2 has a normal thickness, as indicated at $x$.

Figure 2:
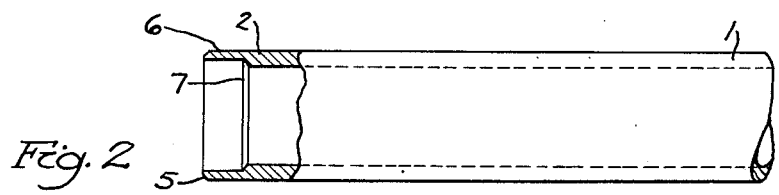
Fig. 2 is a view partly on cross section showing a length of tubing with its end counter-bored preparatory to its expansion.

The first step in the treatment of the end of the tubing to expand it, is to remove some of the metal. This may be done in a simple manner, as by means of passing a rotary drill 3 into the end of the tubing. As shown in Fig. 2, the end of the tubing is counter-bored thus leaving an extreme end section, as shown at 6, which is relatively thin as compared to the normal thickness of the tubing wall. The intersection between the counterbored wall section 6 and the normal tubing wall 2 is preferably a shoulder disposed on an angle, as shown at 7. The purpose of this will presently appear.

Figure 3:
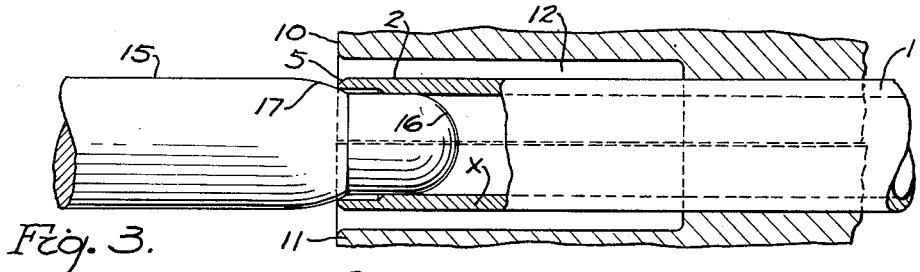
Fig. 3 is a view of a piece of tubing in position in a holding clamp and showing the expanding punch just ready to enter the same.

The tubing thus formed is then placed in a clamp, as shown in Fig. 3. There is a clamping portion 10 and a clamping portion 11 which are arranged to separate from each other in order to receive the tubing and arranged to move toward each other to grip the tubing. This structure is well known to those versed in the art and needs no detailed disclosure. Suffice it to say, that the clamp is formed with a recess so as to provide a clearance space 12 extending around the end of the tubing. The expanding punch is shown at 15, and as illustrated in Fig. 3, the punch is just entering the tubing. This punch has a piloting end 16 which enters the tubing and a portion of gradually increasing diameter, as shown at 17. As illustrated in Fig. 3, the inclined portion 17 is just in contact with the end of the tubing, the same just touching the inner peripheral edge of the end of the tubing. The extreme end of the tubing may be slightly bevelled as at 5, this being accomplished in the operation of de-burring the end of the tubing.

Figure 4:
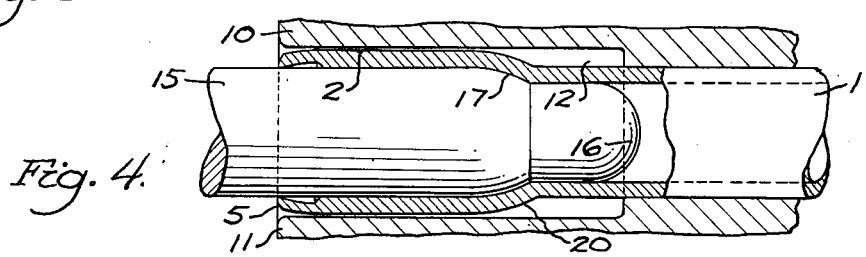
Fig. 4 is a view similar to Fig. 2 showing the completed expanding operation.

With the tubing thus held clamped, the expanding punch enters the same and expands the tubing as shown in Fig. 4. The punch may be advanced relative to the holding clamps or the holding clamps may be advanced relative to the punch. The enlarged or expanded end of the tubing is thus determined by the size of the punch. The tapered portion 17 of the punch aids in forming a rather gradual taper or slightly rounded section 20 at the intersection between the normal tubing wall and the expanded portion. As the punch enters the tubing, it will be appreciated that the metal of the tubing wall, beginning at the offset 7, receives the maximum expansion. However, inasmuch as the inside diameter of the section 6 is larger than the inside diameter of the tubing inwardly of the shoulder 7, the section 6 of the tubing is not expanded so much.

Figure 5:
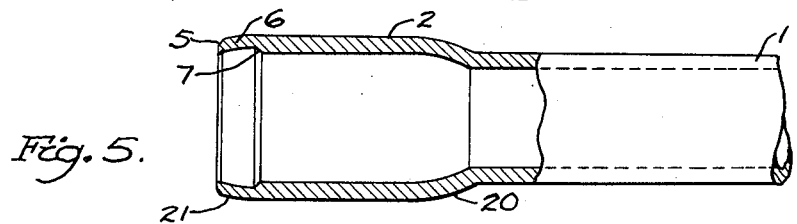
Fig. 5 is a view partly in cross section showing the finished expanded tubing end.

With a punch, as shown in Figs. 3 and 4, the section 6 of the tube is expanded to some extent but, in any event, this expansion is not sufficient to cause the metal at the end of the tubing to crack. The result usually is that the section 6 of the tubing tapers or curves inwardly from about the location of the shoulder 7 to the extreme end, as shown in Fig. 5, thus providing an exterior contour 21 closely matching and comparable to the contour of the portion 20. This makes for a nice symmetrical appearance. When the punch is retracted, the tubing structure is, as shown in Fig. 5.

Figure 6:
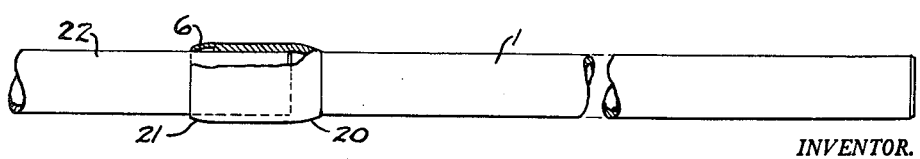
Fig. 6 is a view partly in cross section showing a coupling with a length of tubing telescoped into the expanded end.

In Fig. 6, a finished coupling is illustrated wherein another conduit element, such as a tubing 22, is telescoped into the expanded end, it being appreciated that the joint thus formed may be sealed in a suitable manner as by means of hard or soft solder or the like. Needless to say the size of the punch and the amount of the expansion is determined in accordance with the size of the tubing 22 which is to be inserted into the expanded end. As shown in the drawings, the two lengths of tubing 1 and 22 are of about the same size.

In so forming the end of a tubing, various factors enter into the picture, and some of these are variable depending upon conditions and materials. These factors include the axial depth of the counter-bore. The nature of the stock as to relative hardness and softness is a factor to be considered in determining the axial depth of the counter-bore, as well also as the thickness of the stock and the amount of expansion desired. For example, if the stock is hard, the bend, such as the bend at 20, spreads out over more axial extent than if the metal were more soft. In any event, the direct expansion at the extreme end of the tubing is minimized sufficiently so that a split or crack will not occur at the extreme end. Otherwise, a split or crack which once starts will progress axially of the tubing. Of course, when the shoulder 7 rides up on the punch and is expanded, indirect expansion forces are applied to the thinned wall section 6 of the tubing. There should be sufficient metal left in the thinned wall section to resist and overcome these indirect expansion forces so that the extreme end of the tube is not substantially expanded by the forces applied at the shoulder 7. This gives the tapered or slightly rounded contour at the extreme end of the tubing with the extreme end having its inside periphery remaining substantially against the punch as shown in Fig. 4. The inclined shoulder 7 provides for spreading the direct expansion forces so that the direct expansion forces on the shoulder are not localized to such an extent as to rupture the tubing.

I claim:

The method of expanding the end of a length of tubing so that it may telescopingly receive a conduit member for connection thereto which comprises, internally counterboring the end of the tubing to provide an end section with an internal diameter greater than that of the normal internal diameter of the tubing, and with a wall thickness less than the wall thickness of the normal tubing, leaving a shoulder at the intersection of said end section and the normal tubing wall, passing an expanding tool into the tubing to an axial extent beyond said shoulder to expand the tubing from its extreme end to a location beyond said shoulder, so that the expanded wall of said section constitutes a minor part of the expanded portion and the expanded normal tube wall inwardly of said shoulder constitutes a major part of the expanded portion, the extent of the expansion of the wall of said end section, by reason of the relief provided by the counter-boring, being less than the expansion of the normal tubing wall inwardly of the shoulder, whereby to substantially prevent splitting at the extreme end of the tubing.

References Cited in the file of this patent

UNITED STATES PATENTS

| Number | Name | Date |
|---|---|---|
| 40,967 | Van Guysling | Dec. 15, 1863 |
| 42,159 | Blackwood | Apr. 5, 1864 |
| 427,240 | Nason | May 6, 1890 |
| 853,900 | Saunders | May 14, 1907 |
| 1,106,798 | Frey | Aug. 11, 1914 |
| 1,538,610 | Bast | May 19, 1925 |
| 1,656,222 | Oakley | Jan. 17, 1928 |
| 2,241,091 | Hood | May 6, 1941 |
| 2,306,160 | Freyssinet | Dec. 22, 1942 |